Figure 1:
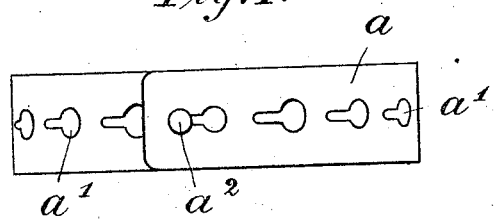

K. K. SCHRADER.
ART OF CANNING MEAT.
APPLICATION FILED NOV. 11, 1909.

981,694.

Patented Jan. 17, 1911.

Witnesses
B. Dommers
May Ellis.

Inventor
Karl Konrad Schrader,
By Henry Orth Jr.
Atty.

UNITED STATES PATENT OFFICE.

KARL KONRAD SCHRADER, OF ALTONA, GERMANY.

ART OF CANNING MEAT.

981,694.

Specification of Letters Patent.   Patented Jan. 17, 1911.

Application filed November 11, 1909.  Serial No. 527,414.

*To all whom it may concern:*

Be it known that I, KARL KONRAD SCHRADER, a subject of the King of Prussia, and resident of Altona-on-the-Elbe, Prussia, Germany, have invented a new and useful Improvement in the Art of Canning Meat, of which the following is a specification.

Preserved meat sold in tins or cans such as boiled ham, corned beef, and the like heretofore was produced by the meat being freed of its bones then tied together by strings and placed into cans, which thereupon were hermetically closed and boiled together with their contents. This manner of introducing the goods into the cans has drawbacks inasmuch as the binding together by strings does not prevent the meat from separating and partly falling asunder during the boiling-action. The consequence is, that when for consumption the meat is cut, no full or solid slices are obtained. It is not advisable to press the meat directly into the cans, so as to produce a solid and uniform mass since the broth that rises during boiling coagulates later on to a stiff jelly that would amalgamate with the wall of the can and fill the can so tight, that on account of the air pressure it is impossible to extract the contents as a whole but must be taken out by bits.

It has been suggested to give the meat a preliminary boiling without any bracing and then to press it into cylindrical molds and when cooled down to introduce the cylindrical meat bodies thus produced, in cans of considerably larger diameter making use of corrugated sheet metal rings intermediate between the meat bodies and the walls of the cans. The hollow spaces which hereby are left around the meat bodies are then filled with a broth, that coagulates in cooling down, and now the cans are closed and heated until their contents are well done. This method of preserving meat by previously boiling and pressing it, has the disadvantage, that a considerable amount of juice and fat will be lost and during the subsequent boiling, the meat within the corrugated ring is liable to partly fall to pieces; the ring only having the object of holding the meat centrally in the can and of giving the body a corrugated mantle of jelly, which when the meat is taken out and the ring is removed, hides the fractures within, created by the final boiling and gives the body of meat a wrinkled surface.

According to my present invention I make use of the following method, which particularly may be made use of for preserving boned ham, but may also be employed with advantage for making other tinned or canned meat in larger solid pieces.

Figure 2:
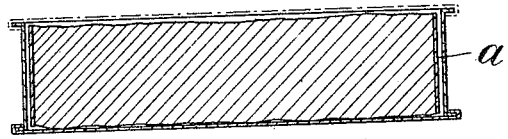

Reference is had to the accompanying drawing, in which:

Figure 1 shows a brace used in connection with my invention and Fig. 2 shows a can filled according to my invention with meat in section, the cover being shown in dotted lines.

I first bone the raw ham or other meat as usual and then brace it by a perforated sheet metal band or strap $a$, as shown in Fig. 1. The perforations $a'$ are preferably oblong and have on one end a circular enlargement, to fit over a button $a^2$ fixed to the end of the strap. In placing this strap around the ham or the like it is pulled tight and the button $a^2$ introduced into one of the perforations in such manner, that the body of meat is brought approximately into a circular shape. A can now is chosen of a size to allow the ham together with the brace to be easily slipped into it without being squeezed, Fig. 2. This done the can is placed in the closing machine, in which the ham is subjected to a pressure on its upper surface, so as to snugly adjust itself to the strap and to become perfectly solid and homogeneous. Thus all hollow spaces and crevices caused by removing the bones disappear. The ham attains a shape and size corresponding to that of the strap and when the cover is fixed and closed air tight the upper surface of the meat fairly contacts with the cover. When thus closed the can is boiled in usual manner. The brace inclosing the ham fills up the space within the can almost completely and for this reason the juice, which arises during boiling and when cooled forming a thick jelly encircles the ham in all parts. The metal strap, into which the meat has been well pressed, as described above, prevents the ham or other meat from falling into pieces most effectively, so that it remains firm and solid.

When a can thus prepared is opened the ham can be easily taken out as a whole, by simply dumping or tilting it over. The ham which does not cling to the wall of the can, but is separated from it by the brace, falls together with this metal brace out of the can, whereupon the brace is opened and taken off. The ham thus produced is in the shape of a regular and smooth body and when cut will enable perfect solid slices to be obtained having a fairly even structure or density throughout.

I claim:

1. The art of producing canned meat which consists in removing the bone from the meat, placing a metallic band tightly around the boned meat, placing the meat thus boned into a can of substantially the same height as the band and of slightly greater diameter than the band and of less height than the body of meat, pressing the can cover on to the can thereby compressing the meat within the band and finally boiling the closed can.

2. The art of producing canned meat which consists in removing the bone from the meat, placing a metallic band tightly around the boned meat, placing the meat thus bound into a can of substantially the same height as the band and of slightly greater diameter than the band thereby forming an annular space between the band and can, said can being of less height than the body of meat, pressing the can cover onto the can thereby compressing the meat within the band without expanding the latter, sealing the can and finally boiling the closed can until said annular space is filled with juice whereby when the can has become cool a layer of jelly forms in said annular space.

KARL KONRAD SCHRADER.

Witnesses:
MAX KAEMPFF,
ERNEST H. L. MUMMENHOFF.